(12) United States Patent
Meller

(10) Patent No.: US 10,455,986 B2
(45) Date of Patent: Oct. 29, 2019

(54) OVEN ROASTING RACK

(71) Applicant: Bruce T Meller, Decatur, GA (US)

(72) Inventor: Bruce T Meller, Decatur, GA (US)

( * ) Notice: Subject to any disclaimer, the term of this patent is extended or adjusted under 35 U.S.C. 154(b) by 225 days.

(21) Appl. No.: 15/588,832

(22) Filed: May 8, 2017

(65) Prior Publication Data

US 2018/0249864 A1 Sep. 6, 2018

Related U.S. Application Data

(63) Continuation-in-part of application No. 29/595,886, filed on Mar. 2, 2017, now Pat. No. Des. 838,548.

(51) Int. Cl.
*A47J 43/18* (2006.01)
*F24C 15/16* (2006.01)

(52) U.S. Cl.
CPC .............. *A47J 43/18* (2013.01); *F24C 15/16* (2013.01)

(58) Field of Classification Search
CPC ......... A47J 43/18; A47J 37/041; A47J 37/049
USPC ............................................. 99/419; 220/491
See application file for complete search history.

(56) References Cited

U.S. PATENT DOCUMENTS

| | | | | |
|---|---|---|---|---|
| 3,473,464 | A * | 10/1969 | Lasker | A47J 37/049 99/421 R |
| 5,117,558 | A * | 6/1992 | Hull | A47J 43/18 30/323 |
| 5,802,962 | A * | 9/1998 | Goldyn | A47J 37/0763 126/25 R |
| 5,819,639 | A * | 10/1998 | Spell | A47J 37/041 99/421 H |
| 5,842,409 | A * | 12/1998 | Loffler | A47J 43/18 99/421 V |
| 6,508,167 | B1 * | 1/2003 | Lu | A47J 37/0745 99/419 |
| 8,621,988 | B1 * | 1/2014 | O'Dea | A47J 43/18 211/181.1 |
| 2002/0148361 | A1 * | 10/2002 | Waltman | A47J 33/00 99/427 |
| 2013/0112087 | A1 * | 5/2013 | Hassell | A47J 37/108 99/421 H |

* cited by examiner

*Primary Examiner* — Kevin F Murphy
(74) *Attorney, Agent, or Firm* — Kaplan Intellectual Property Law, LLC; Barry E. Kaplan

(57) ABSTRACT

A rack for cooking poultry or other meat comprises a collapsible frame made from a plurality of rod like members including a cradle within which an elongated skewer is non-rotatably retained such that said skewer may be separable and removable from said rack to turn or plate the poultry.

6 Claims, 3 Drawing Sheets

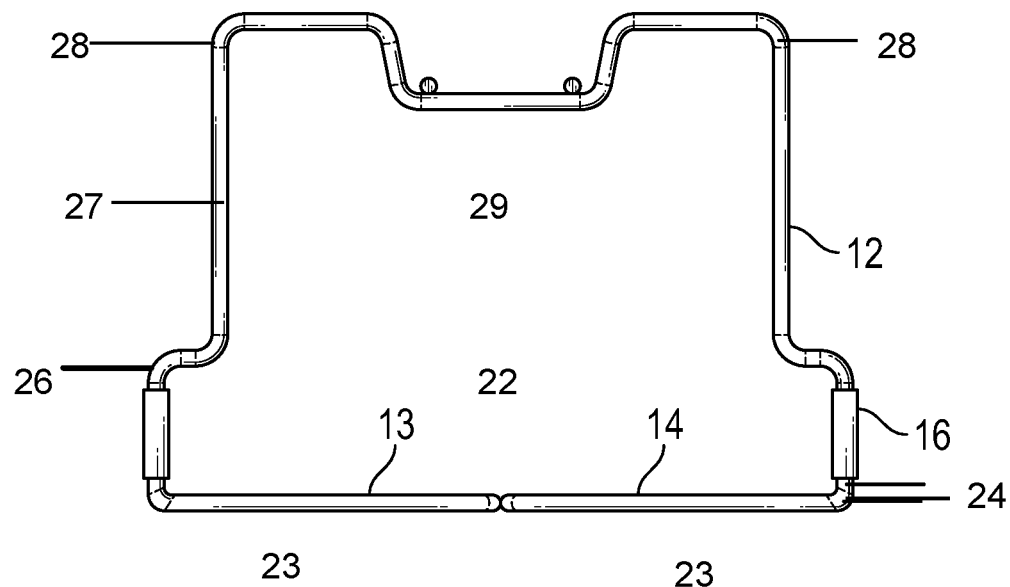
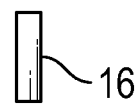
FIG. 3
FIG. 4A  FIG. 4B

OVEN ROASTING RACK

This application is a continuation in part of U.S. patent application Ser. No. 29/595,886 filed on Mar. 2, 2017 entitled Poultry Rack.

FIELD OF INVENTION

The present invention relates to cooking and more particularly to cooking poultry or other meats as in an oven. In even greater particularity the present invention relates to a rack on which poultry or meat can be suspended during cooking and which facilitates the handling of the poultry.

BACKGROUND

Standard poultry racks allow the bird to be placed down on a rack in a pan and the result is ugly marks on the bird. Others have a design in which the bird is placed on a single arm that is supported by legs in the pan. The problem with such a model is that the bird is not securely held and the flipping is difficult to execute and the position of the bird is difficult to maintain. In both cases, there is no easy method of transferring the bird to a serving tray (plating). In our invention, the skewer serves as an easy way to transfer the hot bird to a tray.

As described above, there are roasting racks that allow the bird to be placed across a series of parallel rods—these rods leave marks on the bird and the weight of the bird crushes the breast during cooking resulting in an unattractive presentation and also pushing some of the juices of the meat out of the meat. The other design supports the bird with a single center rod—it does not hold the bird securely during flipping or rotating so the bird may not stay in a breast-down position during cooking.

OBJECTS OF THE INVENTION

When roasted breast-side up, the breast meat in poultry tends to dry out during cooking. One object of the invention is to avoid such drying by roasting the bird breast-side down to allow the juices from the meat to flow down into the breast meat using gravity. The problem is that cooking a bird on a rack faced breast down results in leaving unattractive marks on the breast and compressing the meat. Thus, other object of the invention must be to avoid leaving unattractive marks on the breast and compressing the meat.

Another object is to enable a cook to easily move a heavy bird that is very hot and greasy from the oven to the serving platter Yet another object of the invention is to is to keep the bird stable on the rack during cooking and flipping.

A further of object of the invention is to provide a rack meeting the forgoing objects which can be readily stored and used with a variety of ovens.

SUMMARY OF THE INVENTION

The new feature is the skewer in combination with the rack. They fit together to securely hold a large bird for cooking, allow it to be flipped easily, and make transferring the hot bird to a serving tray easy and safe. The skewer penetrates the bird in multiple places to hold it securely: the two long rods pass through the bird's cavity from neck to bottom to carry the weight safely while the two shorter side rods penetrate the breast meat to give purchase for securely flipping the bird. The skewer locks into the rack to prevent the skewer and bird from falling out of the roasting pan during moving to and from the oven. The skewer is uniquely designed in conjunction with the rack to keep the bird from slipping off the rack in either a side-to-side direction or a neck-to-bottom direction. The rack is sized to fit most roasting pans and most ovens in the United States.

This invention allows the cook to position the bird on a skewer resting in a rack with the breast positioned up or down. The bird is suspended above the roasting pan so it does not receive any marks and is not compressed. The bird can be rotated by flipping the skewer. The bird is roasted for a period of time in the breast-down position to allow the juices to flow into the breast meat. Then it is flipped breast-side up to allow the skin to brown on the breast. The skewer provides for stable holding of the bird because it has two prongs that penetrate the bird at the shoulders to hold it firmly during carrying, cooking, flipping and finally plating. The skewer is used to lift the bird and place it on the platter; then the skewer slides out. The result is a well roasted bird with an aesthetically pleasing appearance that has juicy breast meat.

BRIEF DESCRIPTION OF THE DRAWINGS

Referring to the drawings which are appended hereto and which form a portion of this disclosure, it may be seen that:

FIG. 3 is an end elevation view taken from the right end as shown in FIG. 2;

FIG. 4A shows the rod diameter;

FIG. 4B is an end view of the sleeve connector;

DETAILED DESCRIPTION

Figure 1:
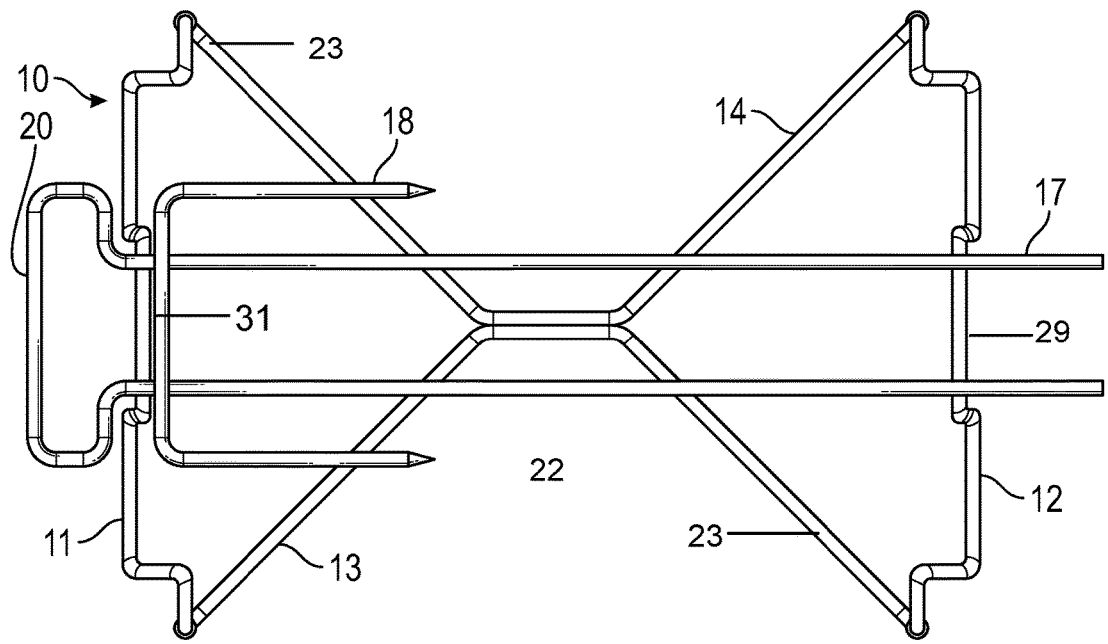
FIG. 1 is a top plan view of the rack.

One or more of the above objects can be achieved, at least in part, by providing a separable skewer and frame as components of the rack. Referring to the drawings for a clearer understanding of the invention, it may be seen in FIGS. 1 to 4b that the rack 10 includes upright frame members 11 and 12 and base frame members 13 and 14. Base frame members 13 and 14 each have a center section 22 joined to each other as by welding or any other process with horizontally disposed arms 23 extending diagonally from the center section to the bottom corners of the frame, such that members 13 and 14 combine to form a horizontal bottom to the frame in a substantially X shaped configuration. Although the specific shape of the horizontal bottom is not critical to the merits of the device, the configuration should sit flat on a subjacent surface and should provide stability to the remainder of the frame. Each of the diagonally extending arms 23 terminates in and up turned stud 24 which cooperative engages upright frame member 11 or 12.

Figure 2:
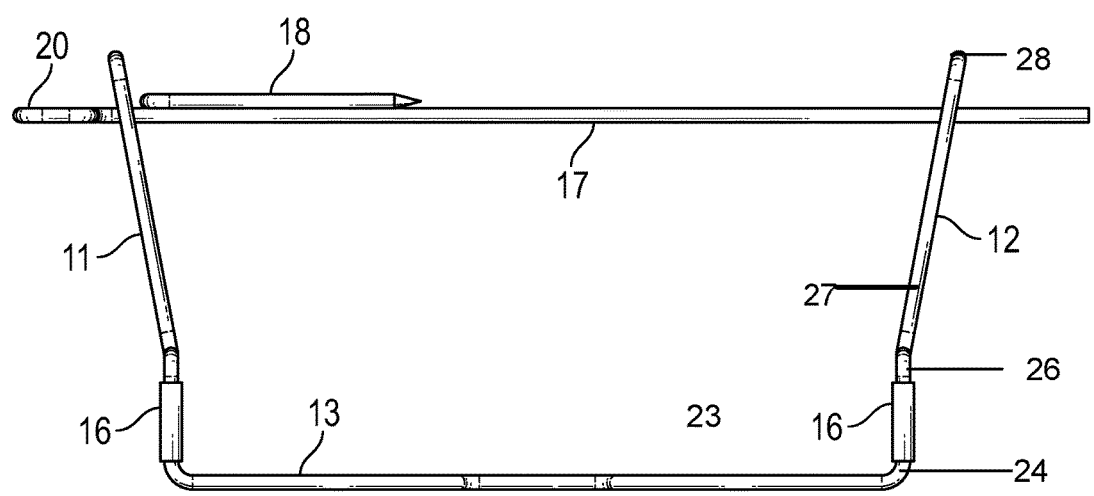
FIG. 2 is a side elevation view of the rack, the opposite side being a mirror image
Figure 5:
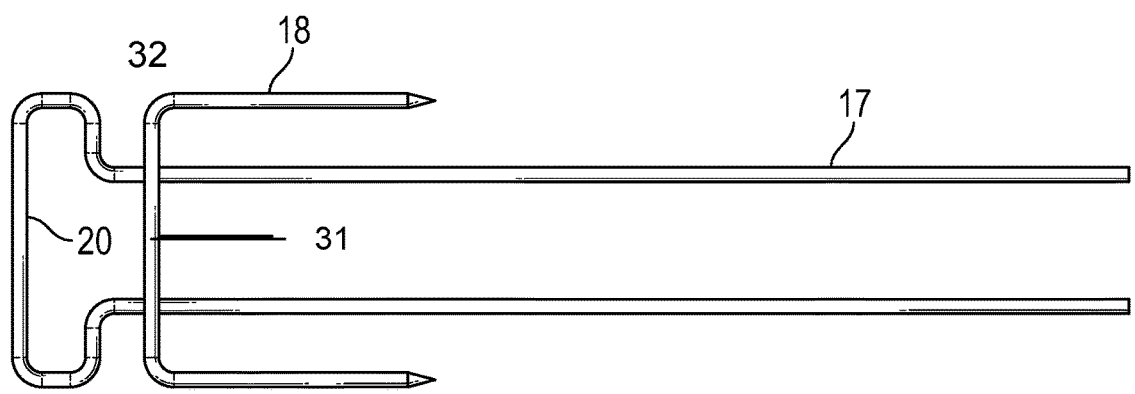
FIG. 5 is a plan view of the skewer.
Figure 6:
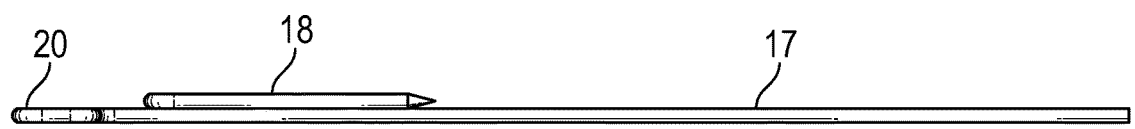
FIG. 6 is a side elevation view of the skewer.
Figure 7:
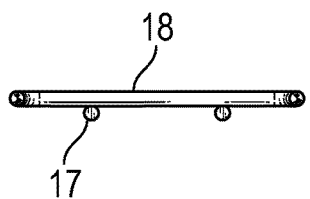
FIG. 7 is and end view of the skewer.

Referring to FIGS. 2 and 3, it will be seen that each upright frame member is an elongated rod or tube that has been specifically formed for the purposes of the frame. Each end of the frame member 11 or 12 carries a sleeve connector 16 which is retained thereon and by receiving an upturned stud 24 of the base frame members 13 or 14 releasably secures the upright frame members to the base frame members. It is to be understood that the frame is not intended to be lifted by the upright frame members which are intended as support members. Proximal the associated sleeve connector 16 each upright frame member 11 or 12 forms an inwardly bending elbow 26 and then extends upwardly and outwardly as a vertical portion 27 from the subjacent stud 26 for a suitable distance to a central section of the upright frame member. The central section extends generally horizontally between a pair of shoulders 28 with a central cradle region 29 intermediate the shoulders. It may be understood that the upright frame members have been formed from resilient metal rods and therefore may have an inherent spring effect such that the upright frame members need to be flexed inwardly to secure the sleeve connectors on the base member studs thus securely connecting the frame members together. It will also be appreciated that the frame members are appropriately sized to support the weight of a turkey, ham or other food item without giving way.

There are two parts to the rack: the skewer and the frame. The frame is placed in a standard roasting pan and the skewer fits securely in the frame. Referring primarily to FIGS. 1 and 5 to 7, it may be seen that the skewer includes a handle 20 formed integrally with a pair of long rods 17 which are of sufficient length to pass through the poultry and rest in the central cradle regions 29 of the upright frame members 11 and 12. The handle 20 and rods 17 are formed from a metal rod such that the handle 20 extends laterally outwardly of the rods 17 and provides sufficient purchase for a cook's hand to grasp the skewer. A pair of shorter rods 18 are formed integrally with a cross piece 31 which is welded to long rods 17 near handle 20. It will be noted that long rods 17 are substantially parallel one another and separated by a distance just less than the width of the central cradle regions 29 so as to fit there within without significant play. Likewise, cross piece 31 is welded to the long rods 17 at points spaced from the handle such that the central region 29 is captured between the handle 20 and cross piece 31 when the skewer is properly positioned on the frame. Accordingly, the skewer and turkey are mechanically fixed in position on the frame and the bird is held on the skewer. In a conventional oven, this format is successful. However, when cooking on a smaller grill, one only needs to use the skewer placed across the top of the opening and held up by the outside edge of the grill. The rack is optional in the grill depending on the size of the grill.

When it is time to flip the bird or plate the bird, the user can grasp the handle and the free ends of rods 17 and use two hands to maneuver the bird.

The rack enables a bird to be cooked, flipped and finally plated easily. The rack can be used for many sizes and types of poultry. It can also be used to hold other cuts of meat from other animals. It fits well in most outdoor grills to allow cooks to roast their birds using a variety of cooking equipment.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

I claim:

1. A cooking accessory comprising a handle suitable for grasping by a user, said handle connected to at least two elongated rods, each said elongated rod configured to penetrate a turkey to a first depth, and at least two shorter rods, each said shorter rod configured to penetrate the turkey to a second depth, said handle and said elongated rods forming a skewer extending sufficiently to support the turkey in a suspended manner;
a frame for supporting said skewer, said frame including a pair of formed rod like members forming a horizontal bottom, said rod like members joined at their mid-sections and extending diagonally with respect to said mid-sections to define four bottom corners of said frame, each rod member terminating in an up-turned stud, said frame further including a second pair of formed rod like members releasably connected at opposing ends thereof to said studs and forming a support for said skewer on opposite sides of said frame, each of said second pair including a central region formed as a cradle to receive said pair of elongated rods, said skewer further comprising a cross piece affixed to said pair of elongated rods in spaced relation to said handle such that said central cradle region of said frame extends between said handle and said cross piece when said skewer is supported on said frame.

2. The cooking accessory as defined in claim 1 wherein said central region is adapted to support said skewer at an elevation sufficient to suspend the turkey between said second pair of formed rod like members.

3. The cooking accessory as defined in claim 1 wherein said up-turned studs and said rod like members releasably connected thereto further comprise a plurality of sleeve connectors.

4. The cooking accessory as defined in claim 1 wherein said central region is configured intermediate said second pair of formed rod like members at a height to suspend the turkey above said horizontal bottom.

5. The cooking accessory as defined in claim 1 wherein said pair of formed rod like members is releasably connected to said second pair of formed rod like members by sleeve connections carried by said second pair of formed rod like members.

6. A cooking accessory comprising a handle suitable for grasping by a user, said handle connected to at least two elongated rods, each said elongated rod configured to penetrate a turkey to a first depth, and at least two shorter rods, each said shorter rod configured to penetrate the turkey to a second depth, said handle and said elongated rods forming a skewer extending sufficiently to support the turkey in a suspended manner;
a frame for supporting said skewer, said frame including a pair of formed rod like members forming a horizontal bottom, said rod like members joined at their mid-sections and extending diagonally with respect to said mid-sections to define four bottom corners of said frame, each rod member terminating in an up-turned stud, said frame further including a second pair of formed rod like members releasably connected at opposing ends thereof to said studs and forming a support for said skewer on opposite sides of said frame, each of said second pair including a central region formed as a cradle to receive said pair of elongated rods, said skewer further comprising a cross piece affixed to said pair of elongated rods in spaced relation to said handle such that said central cradle region of said frame extends between said handle and said cross piece when said skewer is supported on said frame;
wherein said pair of formed rod like members is releasably connected to said second pair of formed rod like members by sleeve connections carried by said second pair of formed rod like members.

* * * * *